Oct. 16, 1962 E. C. THOMSON 3,058,536
MACHINE FOR APPORTIONING AND WEIGHING UNIT
QUANTITIES OF MACARONI AND
SIMILAR STRAND PRODUCTS
Filed Oct. 31, 1958 5 Sheets-Sheet 4

Inventor
Elisha C. Thomson
by Maxwell Fish
Atty.

Oct. 16, 1962 E. C. THOMSON 3,058,536
MACHINE FOR APPORTIONING AND WEIGHING UNIT
QUANTITIES OF MACARONI AND
SIMILAR STRAND PRODUCTS
Filed Oct. 31, 1958 5 Sheets-Sheet 5

United States Patent Office 3,058,536
Patented Oct. 16, 1962

3,058,536
MACHINE FOR APPORTIONING AND WEIGHING UNIT QUANTITIES OF MACARONI AND SIMILAR STRAND PRODUCTS
Elihu C. Thomson, Wellesley, Mass., assignor to Farrington Machines, Inc., Cambridge, Mass., a corporation of Massachusetts
Filed Oct. 31, 1958, Ser. No. 771,120
23 Claims. (Cl. 177—1)

The present invention relates to a machine for apportioning and weighing unit quantities of macaroni and similar strand products.

It is a principal object of the invention to provide a novel and improved machine for apportioning and weighing unit quantities of macaroni, spaghetti, and similar strand products which will effect a rapid and efficient apportionment and weighing of such products in a continuous operation.

It is another object of the invention to provide a hopper for storage of the product and a device associated therewith for separating volumetrically determined quantities of the product from the supply, which is well adapted for effecting such separation rapidly and efficiently and with a minimum of breakage and loss of the individual strands.

It is another object of the invention to provide a novel apparatus and method of effecting the rapid approtioning and weighing of the product in unit quantities whereby a single rapid weighing operation only is required for each successive lot of the product presented thereto and correction is thereafter made within acceptable tolerances by the addition of small volumetrically determined increments of the product to arrive at the desired weight for each successive unit.

Other objects of the invention are to provide novel and effective devices for the more efficient control and handling of the product during each of the several separating apportioning and weighing operations hereinafter set forth.

With these and other objects in view as may hereinafter appear the several features of the invention consist in the method and in the constructions, combinations and arrangement of parts hereinafter described and claimed which together with the advantages to be obtained thereby will be readily understood by one skilled in the art from the following description taken in connection with the accompanying drawings in which:

The machine for apportioning and weighing unit quantities of macaroni, spaghetti and like products which forms the subject matter of the present invention comprises a transfer device adapted to receive from a source of supply increments or bundles of said product which are volumetrically measured and which include one or more bundles forming a large increment having an estimated weight somewhat less than the desired unit weight, and one or preferably a plurality of small bundles providing individual small increments each with an estimated weight. The bundles of the product forming the large increment are transferred to a weighing device which registers accurately the weight deficiency of the large increment. A selector device having means responsive to the registered deficiency of weight of said large increment of the product now operates to select from said small increments one or more bundles of the product having a total estimated weight equal to the weight deficiency as determined by the scale, and causes said selected increments to be added to the large increment so that a bundle of the product of unit weight is assembled for a subsequent packaging operation.

Figure 1:
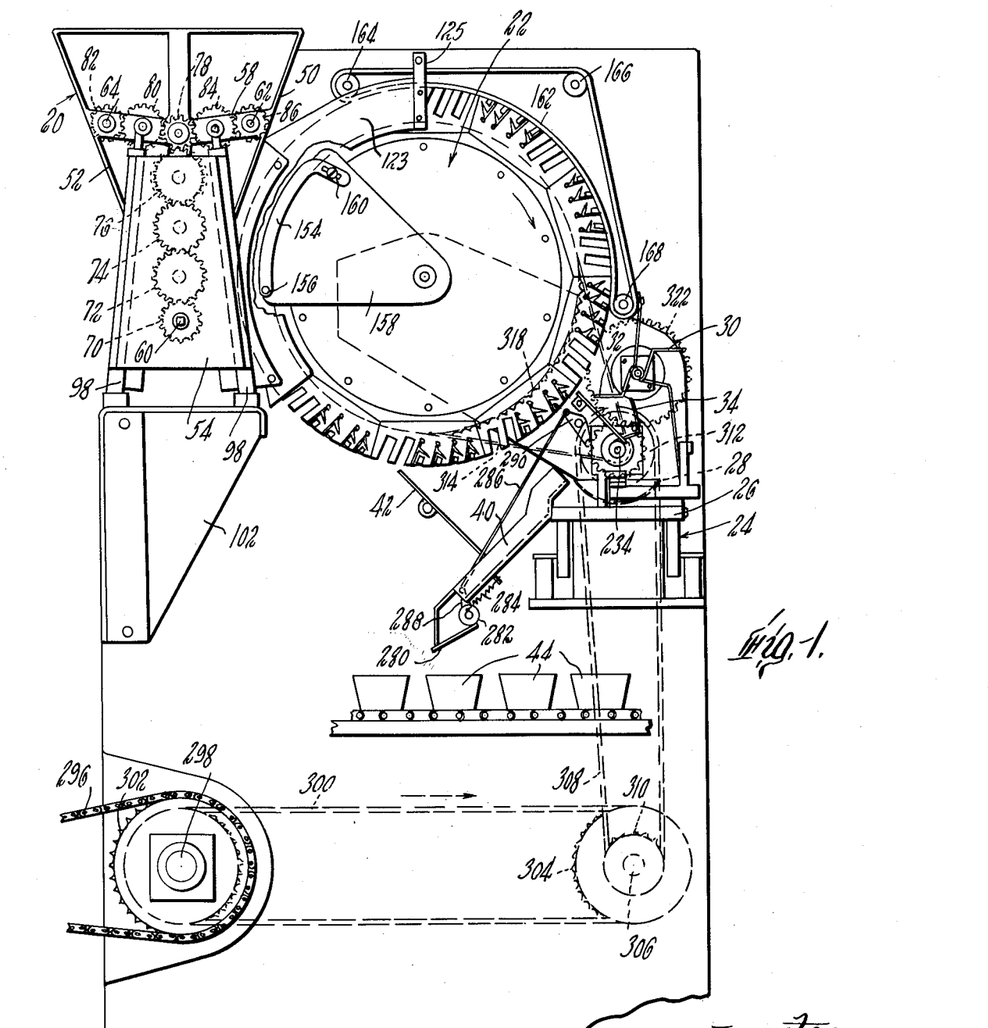
FIG. 1 is a view in side elevation of a machine for apportioning and weighing macaroni, spaghetti, and similar products the outside casing having been removed to illustrate underlying parts embodying in a preferred form the several features of the invention.

Referring more specifically to the drawings FIG. 1 discloses a hopper 20 into which the macaroni or similar strand product is fed by an operator and in which the strands are brought into a parallel relationship, a transfer element which takes the form of a wheel 22 of substantial diameter which may, for example, be in the order of 30 inches to 36 inches having formed therein a series of recesses by means of which volumetrically measured bundles or increments of said strand product are withdrawn from the hopper and transferred to a weighing and apportioning station, and a weighing device 24 which comprises a vertically movable platform 26 on which is mounted a cylindrically curved pan 28.

The rotation of the wheel causes a large increment of the strand product to be weighed to be discharged from the large increment recess or recesses in the wheel 22 onto one of two check paddles 30, 32 and thereafter onto the upper side of a sweep 34 by means of which the increment is deposited in the pan for weighing. This operation is repeated in accordance with a recurring cycle. The sweep acts at the same time that the increment to be weighed is deposited in the pan to sweep the previously weighed increment or lot of the product into a chute 40. Such additional smaller increments as may be required to be combined with the previously weighed increment in accordance with the weight deficiency noted by the scale to make up a bundle of unit weight of the products are simultaneously discharged from other selected small increment recesses in acocrdance with the dictation of the selector mechanism, and are guided on a chute 42 to the chute 40, the entire lot or bundle being directed into one of a series of buckets 44 forming part of a conventional packaging machine.

The hopper 20 as best shown in FIGS. 1, 2, 3, and 12 comprises an outer skin in the form of a rear wall 52 which converges with a front wall 50 to form a wedge shaped container and two end walls 54, 56 which as hereinafter more particularly pointed out, are adjustable toward and away from one another. The front and rear walls 50 and 52 are rigidly secured together by means of transversely extending straps 58 to provide a skeleton frame with relation to which the two end walls 54, 56 are adjustable toward and away from each other. The end walls are supported in parallel position by means of three positioning screws shown in FIG. 1 at 60, 62, and 64 each of said screws being threaded into a nut 66, formed in the front end wall 54 and reversely threaded into a nut 68 formed in the rear end wall 56 of the hopper. A relative adjustment of the end walls 54 and 56 toward and away from each other is effected by means of a crank applied to the lower screw 60 which is connected at its rear end to operate a series of spur gears including a gear 70 secured to the rear end of the shaft 60, idler gears 72, 74, 76, and 78 arranged vertically one above the other on pivots formed on the outer face of the rear wall 56. The spur gear 78 is in turn connected by means of an idler gear 80 with a gear 82 on shaft 64, and is connected by means of an idler gear 84 with a gear 86 on screw shaft 62.

Figures 2, 3, 4:
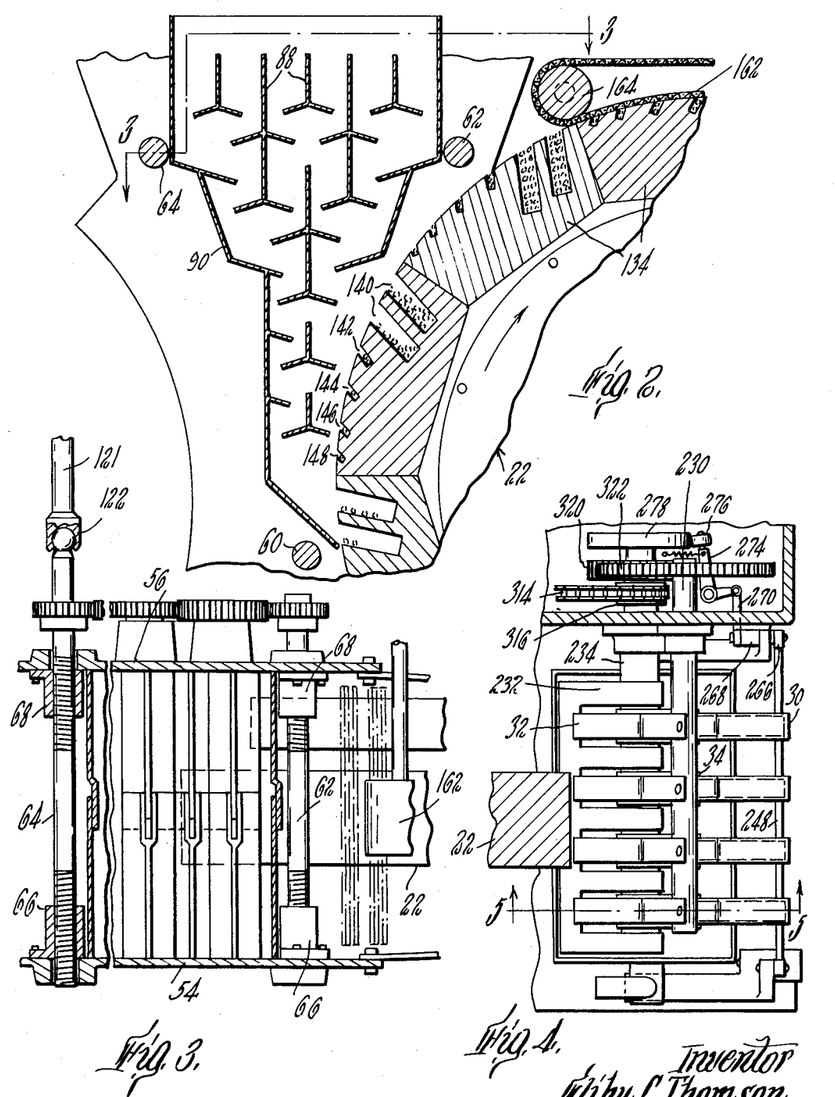
FIG. 2 is an enlarged, detailed sectional view of the hopper and a portion of the associated wheel slotted to receive volumetrically determined increments of the product from the hopper.
FIG. 3 is a sectional plan view taken on a line 3—3 of FIG. 2 to illustrate particularly the construction and arrangement of the vanes in the hopper, the width adjusting mechanism, and the connection with the hopper vibrator mechanism.
FIG. 4 is a detail, plan view on a enlarged scale illustrating particularly the check paddles and sweep associated with the weighing pan and the portion of the wheel adjacent thereto shown in FIG. 1.

As best shown in FIGS. 2 and 3 the interior of the hopper 20 is provided with a series of baffles 88, each of said baffles comprising a vertical vane and at the lower edge thereof two downwardly sloping transverse vanes. The baffles 88, are each formed in two sections, one section being secured to the front end wall 54, the other section in parallel alignment therewith being secured to the rear end wall 56, so that the end walls of the hopper may be readily moved relatively to one another. From an inspection of FIG. 2 it will be apparent that the baffles, 88 provide a storage container having the outer surfaces thereof converging inwardly for guiding and positioning the strands of macaroni or other material against the peripheral surface of the wheel 22. The front wall 50 of the hopper which lies adjacent the wheel 22 terminates substantially above the lower edge of the rear wall 90 of the baffle arrangement thus providing a substantial area within which the strands are permitted to move against the periphery of the wheel and into the recesses formed in the wheel 22, as hereinafter set forth.

Figure 13:
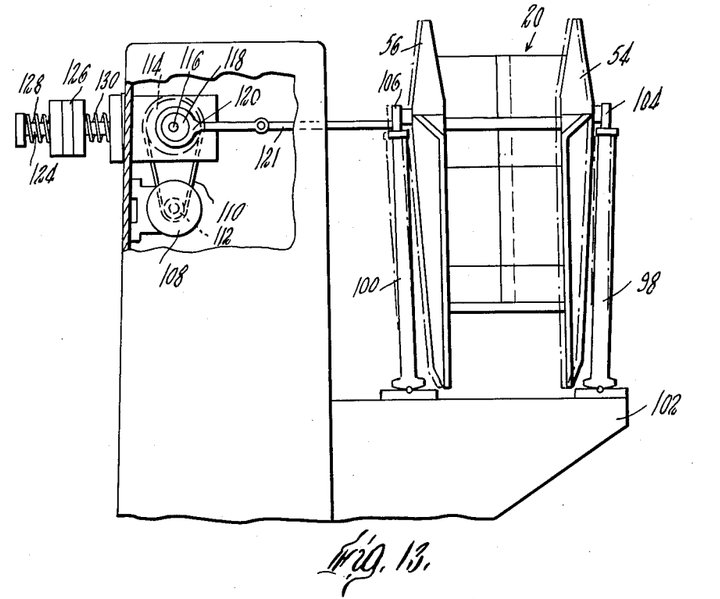
FIG. 13 is a somewhat fragmentary elevation of the machine shown in FIG. 1 looking from the left of FIG. 1 to illustrate particularly the hopper and the device for imparting a shaking movement thereto.

Referring to FIGS. 3 and 13 the hopper 20 is mounted for a translatory movement in a transverse plane across the width of the wheel 22 and lengthwise of the strands disposed in the hopper 20. To this end the entire hopper is mounted on two frames 98 and 100 which are pivoted at their lower ends for a rocking forward and back movement on the base 102, and at their upper ends are connected by universal joints 104, 106 with the front and rear end walls 54, 56 respectively of the hopper. The hopper is given a rapid back and forth shaking movement by means of connections which (see FIG. 13) include an electric motor 108 mounted on a fixed portion of the machine and connected by a belt 110 and pulleys 112, 114 with a cross shaft 116 which carries an eccentric 118. An eccentric strap 120 riding on the eccentric 118 is connected by means of a link 121 and a universal joint 122 with the rear end of screw shaft 64 (see FIG. 3). With this arrangement a rapid transverse reciprocating movement is imparted to the hopper which causes strands of macaroni or spaghetti or similar products loaded into the hopper to be shaken out into a parallel position and to flow readily into the slots of the wheel 22 as hereinafter described. It will be understood that the end walls of the hopper will be preferably adjusted so that the end walls are a distance apart slightly in excess of the length of the longest strand of the product being packaged. Where shorter strands are being packaged it has been found desirable to adjust the distance apart of the end walls in order to insure a maximum shaking down action of the hopper, although this adjustment is not essential to the operation of the machine.

For compacting the strands endwise as they are fed into the respective slots two curved flange members 123 are provided one at each side of the wheel overlying the ends of the strands as they are fed into the slots. The flange members 123 are secured to the hopper to vibrate therewith. At their upper ends the members 123 are secured to fixed brackets 125 so that the vibratory movement imparted to the flanges and to the slot supported strands engaged thereby is gradually reduced to zero as the strands are carried to the top of the wheel.

It will be noted that there is secured to the portion of the housing which supports the motor 108 and eccentric vibrating element 118 a dynamic absorber in the form of a rearwardly extending shaft 124 on which is mounted a weight 126 positioned by means of two counteracting springs 128, 130 coiled about the shaft 124 at each side of the weight 126. The period of vibration of the hopper is adjusted to be equal to the resonance period of the absorber in order to cause the dynamic absorber to act as a counterpoise.

The principal functions of the shaker or hopper 20 are to store a quantity of the product, to guide it into position against the wheel at the required rate without tangling, and to maintain a constant level of the product against the wheel independently of the amount in the hopper. The addition of the baffles to the hopper makes it impossible for twisting of any individual strands to take place except for very short pieces. It will be noticed that with the design employed both the vertical and the slightly inclined transverse vanes of the baffles are interlocked in such a manner as to prevent tangling in any direction. The smooth flow of the product is insured by a series of narrow horizontal openings through which the product must pass on the way down to the wheel. The product is lined up against the peripheral face of the wheel. It has been found that said peripheral surface for the best results should be between 2 and 6 inches wide, that is, wide enough to provide lateral support and at the same time not so wide that the slots will accept only particularly straight pieces. In the illustrated form of the invention, a wheel in the order of 30 inches in diameter and 4 inches in width is employed. The wheel itself takes the form of a circular or disklike frame having at its outer edge ten arcuate segments secured thereto, each segment as indicated at 134 having a width of approximately 4 inches and having formed in the peripheral surface thereof a series of transverse slots including two large slots 140 which together are adapted to hold a large increment of the product having an estimated weight slightly less than the desired unit weight of the product, and adjacent thereto in a counterclockwise direction as viewed for example in FIG. 2 a series of progressively smaller slots indicated respectively at 142, 144, 146, and 148 of the latter slots 142 to 148 inclusive are made progressively smaller and each is adapted to support a volume of the product having an estimated weight, the size of these small increment slots being graduated so that the addition of one or more of these small increments may be used to bring up to the required total the unit weight of the entire bundle when added to the large increments contained in the two slots 140.

Figure 15:
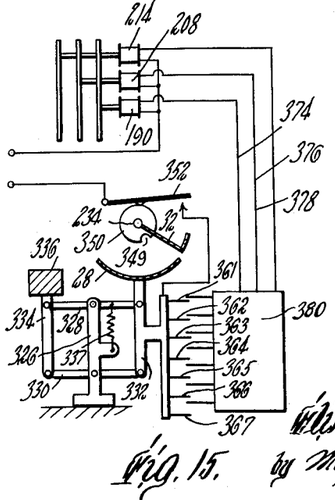
FIG. 15 is a view similar to FIG. 14 but illustrating another form of control in which a binary numbering system is employed which permits any combination of the incremental slots to be opened at the same time, thus providing a substantially wider range of additions which may be made to the originally weighed lot of spaghetti.

Assuming that it is desired to weigh and to apportion the product in one pound lots for packaging, the two slots 140 will be gauged to support a volume of the product which would have an estimated weight somewhere between 13 and 16 ounces. The small incremental slots 142 to 148 inclusive may be designed to carry a total of three ounces. For use with a binary system of control such as that generally indicated in FIG. 15 the small increment slots are preferably constructed to provide each one double the capacity of the next smaller slot in the ratio of 1:2:4:8. The basic increment (that of the smallest slot) will be 1/5 ounce. For simplicity of illustration FIG. 15 illustrates the use of only the first 3 slots having a ratio of 1:2:4 and sized to provide a combined weight of about 1 2/5 ounces, and the large slots 140 are sized to carry a volume of weight between 14 3/5 and 16 ounces. On the basis that 4 are used the smallest slot will have a capacity of 1/5 of an ounce. Since 1/5 ounce is the smallest increment that can be added, the error due to digitization is 1/10 ounce. This is the maximum difference that can exist between what is called for and what can be added. For example, if 9/10 ounce is called for, the machine can supply either 4/5 or 1 ounce which results in a plus or minus 1/10 ounce error. If any other quantity between 4/5 and 1 ounce is called for the error is less than 1/10 of an ounce. Therefore, the error due to digitization is tolerable for a basic increment of 1/5 ounce. If 3 small incremental slots were used with a total of 7 increments each increment would be 3/7, or 3/7 ounce yielding a digitation error of plus or minus 3/14 ounce. It will be evident that the predictable error is greater when only 3 small increment slots are used, leaving a smaller but still reasonably adequate margin for other sources of error within the total 1/4 ounce margin of error permissible.

Figure 14:
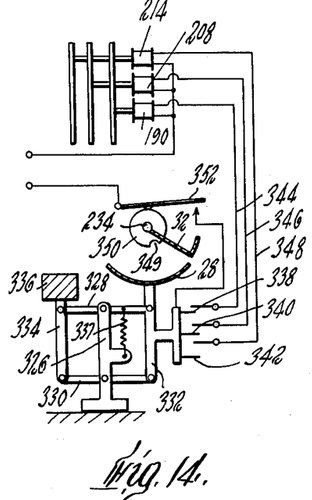
FIG. 14 is a diagrammatic view of the apparatus for weighing a lot of spaghetti or macaroni, and for thereafter adding incremental amounts of the product sufficient to make up a pound thereof said apparatus including a scale and electrical connections from the scale to a series of solenoids operable to remove selected caps from their cover position with relation to the associated incremental recesses, the apparatus of FIG. 13 being particularly constructed and arranged to cause either one, two, or three increments to be added depending upon the extent of movement imparted to the scale at each successive weighing operation.

FIG. 14 discloses a simplified form of control in which the operation of the scale causes either 1, 2, or 3 of the incremental slots to release their loads to be added to the large weighed increment in accordance with the dictation of the weighing machine to make up the unit weight.

It will be noted that the slots 140, and 142 to 148 inclusive are given a positive rake which serves to assist in filling the several slots from the hopper as said slots move upwardly past the open mouth of the hopper disposed at the left hand side of the wheel as viewed in FIG. 1. It will be understood that while two slots 140 are shown which combine to provide the large increment of the product to be weighed, one slot only, or a number larger than two such slots may be employed. It has been found that a plurality of such slots each being constructed and arranged to pick up a relatively small bundle of the strands, each such slot having a relatively narrow mouth for a given depth of slot, is likely to produce a more accurate estimated weight of the product than is produced by the use of one large slot having a relatively wide mouth.

The size of the slots 140, 142 to 148 inclusive, in order to obtain an accurately estimated weight of the product in each slot depends to a considerable extent on the character of the product. The present machine is constructed and arranged to handle any product between extremes of length and of diameter represented by macaroni, thin macaroni, spaghetti, or thin spaghetti. It should be noted that the density of spaghetti is greater than that of macaroni having a different packing factor and because macaroni has a hollow core. Macaroni is generally packaged in lengths appreciably shorter than spaghetti. Adjustment in accordance with the length of the product, particularly in the hopper or shaker has already been described. A device is provided also to control the size of the large slots at 140 which determine the size of the bundles of the product making up the large increment to be weighed. The effective length of each large slot is controlled during the loading operation by means of a stationary, adjustable cam 154 (see FIG. 1) which is pivotally supported at one end at 156 on a fixed bracket 158, and at its other end is adjustably supported by means of a pin and slot connection 160 with the fixed plate or bracket 158. The cam 154 thus provides an adjustable bottom for each slot 140 during the loading operation.

Figure 5:
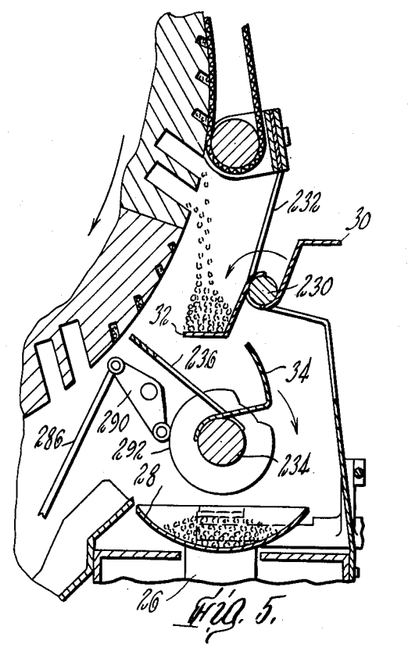
FIG. 5 is a sectional view in side elevation of substantially the parts shown in FIG. 4, the view being taken on a line 5—5 of FIG. 4, the parts being shown in position as one lot is being weighed and the check paddles are about to discharge the next succeeding lot onto the upper face of the sweep.
Figure 6:
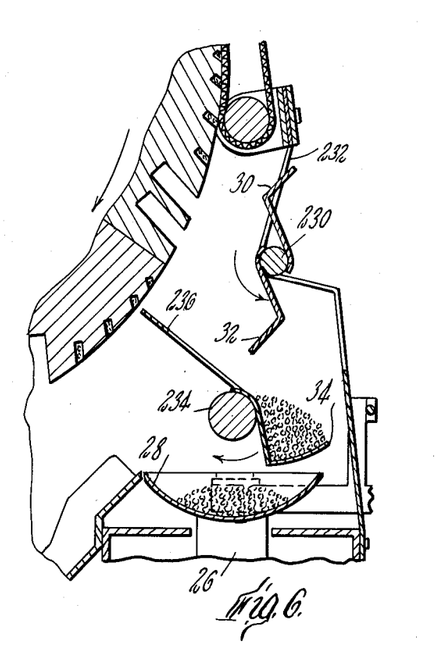
FIG. 6 is a view similar to FIG. 5 but illustrating another position of the parts in which the next lot of macaroni has been discharged onto the upper side of the sweep preparatory to the sweeping of the weighed lot from the weighing pan and the deposit of the new lot thereon.

As previously noted, the wheel 22 is adapted to rotate continuously in a clockwise direction as illustrated, for example, in FIGS. 1 and 2. As the filled large increment slots 140 rise toward the upper part of the peripheral path of the wheel the slots are closed by the engagement with the contacting surface of a belt 162 which rides against the peripheral surface of the wheel and is supported also on idler rollers 164, 166, and 168. The belt 162 is constructed and arranged to maintain the large increment slots 140 closed until a discharge position of the slots 140 is reached at the location of the idler roll 168 at the hand side of the wheel 22 as indicated in FIGS. 1, 5 and 6.

Figure 9:
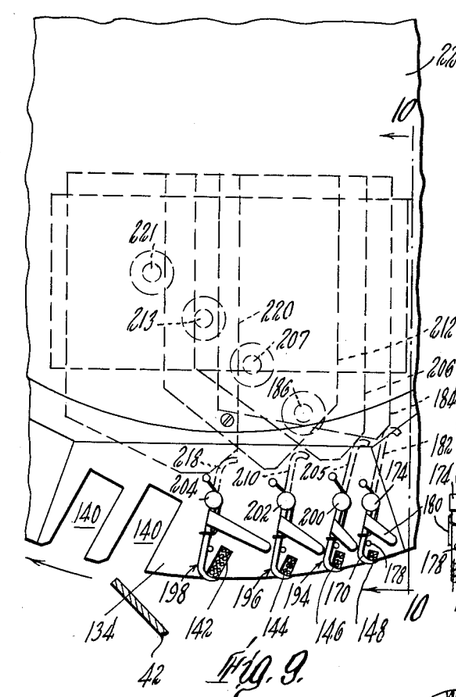
FIG. 9 is an enlarged detail view in side elevation of the lower portion of the wheel shown in FIG. 1 illustrating particularly the recesses in which are supported the volumetrically determined large and small increments of spaghetti or similar product, and illustrating particularly the caps for holding the small incremental bundles of spaghetti in their respective slots.
Figure 10:
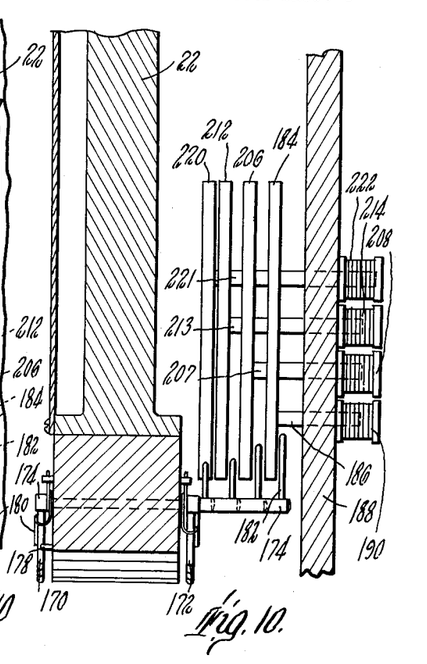
FIG. 10 is a sectional view looking from the right and taken on a line 10—10 of FIG. 9.
Figure 11:
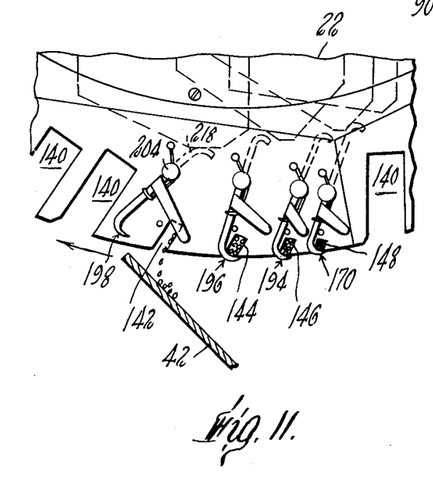
FIG. 11 is a somewhat fragmentary view of the recesses and their caps shown in FIG. 9 but with one of the caps withdrawn to permit the flow of the incremental package of spaghetti into the lot previously weighed by the weighing machine.
Figure 12:
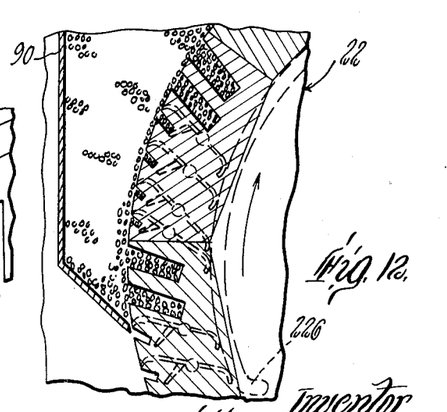
FIG. 12 is a fragmentary sectional view of a portion of the wheel adjacent the hopper illustrating particularly the caps in their cam controlled intermediate product loading position.

In accordance with the invention means are provided for closing or capping each of the small increment slots as soon as they are filled and for opening or uncapping selected small increment slots at the lower discharge position on the wheel periphery in the position shown particularly in FIGS. 9 and 11. The capping device for the small increment slot 148 as shown in FIGS. 9, 10, and 11 comprises a pair of rocker arms or hooks 170, 172 mounted on a rock shaft 174 rotatably supported in the segment of the wheel 22 one of the hooks 170, 172 is supported on each side of the wheel. A small torsion spring coiled about the shaft 174 tends normally to rock the shaft in a counterclockwise direction to the closed capping position of FIGS. 9 and 11 in which a hook 170 is engaged against a stop pin 178 on the segment line of the wheel. Each hook or cap member 170 has formed thereon an offset discharge arm 180 which is adapted for a full clockwise discharge position of the rock shaft 174 and hooks 170 to engage against the bottom portion of the bundle of strands carried in the slot 148 and to positively eject same.

The mechanism for moving the caps to their discharge position as the small increment slots reach their discharge position at the lower end of the peripheral path of the wheel as best shown in FIGS. 9, 10, and 11 comprises a series of cams supported at the rear side of the machine and movable transversely into the path of movement of an upwardly extending cam follower arm carried on the respective cap supporting rock shaft. The cap comprising hooks 170 and rock shaft 174 is controlled in this manner by the engagement of an upwardly extending arm 182 with a transversely shiftable cam plate 184 which is mounted on a rearwardly extending shift rod 186 slidably mounted from the rear plate 188 of the machine frame. The cam plate 184 normally is positioned in a forward inoperative position to the left as illustrated, for example, in FIG. 10, being moved to the right into alignment with the cam follower arm 182 by means of a solenoid 190 carried on the rear face of the machine supporting plate 188, whenever the solenoid 190 is energized in accordance with the dictation of the pattern mechanism hereinafter to be described. As will be readily evident from an inspection of FIGS. 9 to 11 inclusive the caps for covering the small increment slots 146, 144 and 142 respectively are identical with the cap previously described for covering the slot 148. Said cap and ejector units are designated generally at 194, 196 and 198 respectively mounted on rock shafts 200, 202 and 204. The rock shaft 200 has secured to the rear end thereof an upwardly extending cam follower 205 adapted for engagement with a discharge cam plate 206 supported on an axially movable shaft 207 and adapted to be moved laterally into operative position by the energizing of an associated solenoid 208. The rock shaft 202 which carries the cap and discharge unit 196 has secured to the rear end thereof an upwardly extending cam follower arm 210 for engagement with a cam plate 212 supported on an axially movable shaft 213 and adapted to be moved from its normally inoperative position into path of movement of the follower by means of a solenoid 214. The rock shaft 204 which carries the capping and discharge unit 198 has mounted thereon at its inner end an upwardly extending cam follower arm 218 for engagement with a cam plate 220 supported on an axially movable shaft 221 to be moved laterally into operative position in alignment with the follower 218 by means of an associated solenoid 222.

The capping and discharge units above described are arranged each to have three alternative positions: Said positions include a normally closed position, which is the position shown for each of the four units in FIG. 9, a discharge position which is the position shown for the cap and discharge unit 198 in FIG. 11, in which the rock shaft 204 and unit have been rocked in a clockwise direction to a maximum extent, and an intermediate loading position in which the capping and discharge units are located about halfway between their closed and charge positions as shown particularly in FIG. 12. This intermediate position is obtained by means of a capping unit opening cam 226 which is located at the left side of the wheel in the same vertical plane with the discharge position cam plates 184, 206, 212 and 220 above described, and which engages the cam follower members to move each capping and discharge unit to the intermediate opening position shown in FIG. 12 in which the cap is withdrawn and in which the dischage member, as for example, the discharge number 180 associated with the capping and discharge unit 170, is also out of alignment with the base of the respective slot. This is the position shown for each of the capping discharge units in FIG. 12.

The check paddles 30, 32 comprise each a series of narrow paddle arms secured in parallel alignment and spaced from one another on a rotary hub shaft 230. The strands discharged from the two slots 140 illustrated as making up the large increment of the bundle to be weighed are guided against the check paddle 32 (see FIG. 5) by a fixed guide 232 which comprises a comb having the dents thereof interposed between adjacent paddle arms.

The sweep 34 is similarly formed with a series of narrow sweep arms secured in parallel alignment and spaced from one another on a rotary sweep shaft 234. The strands of the product comprising the large increment to be weighed are guided from the check paddles 30 or 32 into the pocket provided by the bent arms of the sweep by means of a fixed guide 236 having narrow fingers which are interposed between the arms of the sweep 34.

Figure 7:
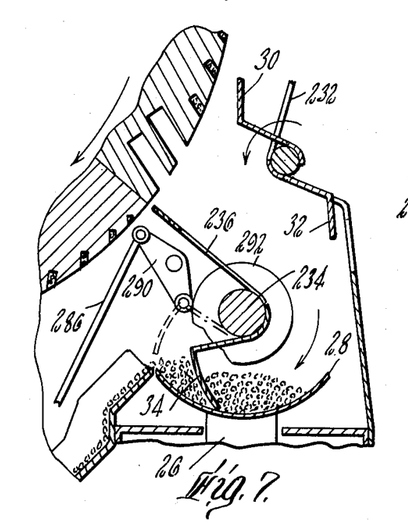
FIG. 7 is a view similar to FIGS. 5 and 6 but with the parts shown at a still later point in the operation in which the movement of the sweep has deposited the new lot of macaroni on the weighing pan and is forcing the previously weighed lot from the weighing pan.

In the illustrated form of the device, the sweep 34 is arranged to cooperate with the cylindrically formed pan 28 of the weighing device which is supported out of contact with the weighing mechanism while the sweep moves through the lower part of its orbit (see FIG. 7) acting to sweep a previously weighed large increment of strands of the product out of the pan into the chute 40 and to deposit a new load in the pan, whereupon the pan is then again lowered into contact with the weighing mechanism. It will be understood that while this construction and mode of operation is preferred, a sweep which may be of a flexible material may be employed, and the construction of the weighing device may be such that the sweeping and depositing action of the sweep 34 may be carried out without the necessity of separating the pan from the weighing mechanism.

Figure 8:
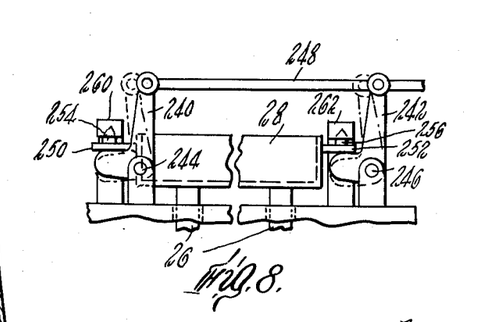
FIG. 8 is a fragmentary, detail view looking from the right of FIG. 6 illustrating the manner in which the pan is lifted to a fixed position free of the scale and into position for the operation of the sweep.

A suitable means for raising the pan to an inoperative fixed position is particularly illustrated in FIG. 8 of the drawings. This mechanism comprises two bell crank lever arms 240, 242 pivoted to a fixed portion of the frame respectively at 244 and 246. The upper ends of the two bell cranks 240, 242 are connected by an actuating rod 248 to move as a unit. The offset lower ends of bell cranks 240, 242 are arranged to engage beneath laterally extending tabs 250, 252 formed at each end of the pan 28. A movement of the control rod 248 to the right causes the pan to be lifted into a fixed position in which two tapered pins 254, 256 formed integrally with the tabs 250, 252 respectively engage in tapered recesses formed in fixed brackets 260, 262. The movement of the control rod 248, as best shown in FIG. 4, is controlled by means of connections which include a vertically disposed arm 266 secured to a rock shaft 268 which is connected by a second arm 270 with one arm of a bell crank cam follower lever 274. A cam follower 276 on the other arm of the bell crank 274 engages a cam 278 on the sweeper shaft 234. The arrangement is such that the pan is lifted to its fixed raised position as shown in FIG. 8 immediately prior to the engagement of the sweep 34 with the pan 28 and is then released as the sweep moves off the opposite side of the pan at the completion of the sweeping and new increment depositing operation.

As will be noted in FIG. 1, a gate 280 is provided at the lower end of chute 40. This gate takes the form of a plate which is supported to turn on a pivot 282 and is normally maintained in a closed position by means of a tension spring 284. The gate 280 is opened periodically in timed relation to the sweeping action of the sweep 34 by means of connections which include a link 286 connected at one end to an upwardly extending arm 288 secured to turn about the pivot 282 with the plate 280, and at its other end with one arm of a cam follower lever 290, the other arm of which is adapted to ride against a cam 292 on the sweeper shaft 234.

The drive for the machine is taken from a power source, not shown, through a sprocket chain 296 (see FIG. 1) onto a shaft 298 which is connected by a sprocket chain 300 and sprockets 302, 304 with an idler shaft 306. The shaft 306 is connected by a sprocket chain 308 and sprockets 310, 312 with the sweeper shaft 234 The wheel 22 is driven at one tenth the speed of the sweeper shaft 234 by means of a sprocket chain 314 (see FIGS. 1 and 4) which passes around a sprocket 316 on the sweeper shaft 234 and around a large sprocket secured to turn with the wheel 22 and indicated at 318 in dotted lines in FIG. 1. The check paddle shaft 230 is driven at a 1:2 ratio with the sweeper shaft 234 by means of two gears 320, 322 mounted respectively on the two shafts 234, 230 in meshing relation with one another.

The operation of the weighing device to energize the respective solenoids 190, 208 or 214 thereby to release selected small increments as indicated by the operation of the weighing device to make up a package of unit weight of the strands will be briefly described in connection with FIGS. 14 and 15. FIG. 14 illustrates in diagrammatic form one form of control of the solenoids from the weighing device in which the small increments are sized to be utilized one at a time to make up the desired unit weight, only one increment being used.

Referring to FIG. 14 the weighing device is diagrammatically shown to consist of a balance comprising a central post or fulcrum 326 having pivoted thereon two parallel balance arms 328, 330 one of which supports a vertical member 332 on which the pan 28 is mounted. The opposite ends of the balance arms 328, 330 are connected with a vertical member 334 which carries a counterpoise 336 equal to one pound. A balancing spring 337 connected between balance arm 328 and a lug on the post 326 offsets the counterpoise 336. The vertical arm 332 is also provided with an extension which carries three contact members 338, 340 and 342 connectable respectively by means of wires 344, 346 and 348 with the solenoids 190, 208 and 214.

Rotation of the sweeper shaft 234 and sweeper 32, shown diagrammatically in FIG. 14, causes a cutout 349 in a cam 350 on sweeper shaft 234 to be engaged by a nub on a switch arm 352 when the sweeper 32 has completed its sweeping operation, thus permitting the switch arm 352 to drop, closing a circuit through one of the contact elements 338, 340 or 342. If the large increment of the product deposited in the scale pan 28 is less than one pound the pan will rise until the spring 26 is extended sufficiently so that its force is equal to the difference in weight with respect to the counterpoise 336. The contact ends of the connecting wires 344, 346 and 348 are spaced relative to the spacing of the contact members 338, 340 and 342 so that if the pan rises a small amount, a circuit is closed through the wire 344 to energize solenoid 190 thus causing the cap for the smallest increment 148 to be removed to add this small increment to the bundle measured by the pan. If a larger deficiency is registered by the weighing device and the pan as thus caused to rise by a somewhat larger amount, a circuit will be closed through contact member 340 and wire 346, while contact 338 becomes disengaged and solenoid 208 is deenergized. Similarly a still larger deficiency will cause the circuit to be closed through contact member 342 and wire 348 to energize solenoid 214 while the solenoids 208 and 190 are both disengaged. It will be understood that the position of the weighing device including the weighing pan 28 and the switch contacts 338, 340 and 342 will become stabilized prior to the raising of the pan to its inoperative position and the start of the sweeping operation, as shown in FIG. 14. The switch arm sleeve 52 is thereafter permitted to drop only when the sweeping operation is completed. During the period of the sweeping operation the weighing mechanism may be maintained in its adjusted position by any suitable locking device, not here shown, until after the switch arm 352 has been permitted to move downwardly to its closed position, thus releasing the desired small increment of strands from the recess 148, 146 or 144 as the case may be which are mingled with the strands of the weighed large increment in the chute 40. It will be understood alternatively that an electrical delay, or signal storage device may be employed to maintain the indicated setting of the switches 338, 340 and 342 during the sweeping operation and until the switch arm 352 has been lowered to close the circuit to the selected small increment cap release solenoid.

In the embodiment of the device shown in FIG. 14, the small increment slots 148, 146 and 144 are arranged to carry volumetric amounts respectively which are equal in weight to the weight difference represented by the corresponding scale contacts 338, 340 and 342. Therefore, when the cam contacts represented by the switch arm 352 are closed, a circuit is established to the solenoid corresponding to the slot containing the amount necessary to make up the weight shortage, and this amount is added as the contents of the scale and are emptied.

FIG. 15 discloses an alternative system for selecting small increments of the product of estimated weight to make up the weight deficiency indicated by the weighing device.

In this form of the device the estimated weights of the several small increments are determined and selection is made in accordance with the binary system which permits a substantially larger number of different estimated small increments to be measured and deposited to make up the indicated deficiency of weight as indicated by the operation of the weighing mechanism, while still a small number only, namely 3 or 4 small increment slots, are employed. For this purpose it is still possible to use three small increment slots which vary in size in accordance with the ratio of 1:2:4. It will be understood that a fourth slot having the ratio of 8 may be used, although for the simplicity of illustration only three slots are herewith used. The small increments from this small number of slots are selected individually and in various combinations to provide a large number of said small increment additions to make up the total unit weight.

For the embodiment of FIG. 15 it is assumed that slot 148 carries an increment having an estimated single unit of weight, slot 146 carries an increment having two units and slot 144 carries an increment having four. Any number of units can then be added from one to seven by opening combinations of one or more slots simultaneously. The weight difference may be measured in a manner similar to that indicated in FIG. 14, seven contacts being provided, however, on the extension of the vertical support arm 332 of the weighing device. Circuits from the individual contacts designated respectively at 361, 362, 363, 364, 365, 366 and 367 pass to a system of relays, not shown, which cause a circuit from switch arm 352 to be established to the solenoids in accordance with the following system:

(1) Switch arm 352 is connected through relay system 380 to wire 374 when balance contact 361, 363, 365, or 367 is closed (2) Switch arm 352 is connected through relay system 380 to energize line 376 when contact 362, 363, 366 or 367 is closed (3) Switch arm 352 is connected through relay system 380 to line 378 when contact 364, 365, 366 or 367 is closed.

With this arrangement, it can be seen that a number of increments corresponding to the weight difference measured will be added by using only the three slots 148, 146 and 144 having a 1:2:4 size ratio. For example, if 5 units are called for, line 374 will be connected to 378 and also to 374. Line 374 corresponds to four units and line 378 to one unit.

The invention having been described what is claimed is:

1. In a machine for apportioning and weighing quantities of macaroni and similar strand products to provide bundles of said strands of unit weight, the combination of a supply means from which said strand product is drawn, a weighing device having means to indicate the amount by which the product weighs less than said unit weight, means to apportion and deliver from said supply to said weighing device a large increment of said strand product having an estimated weight of less than said unit weight, means for rendering said weighing device operative to provide a single said indication, means to deliver said large increment from the weighing device, means to apportion from said supply means a plurality of small increments of said strands each said small increment having a different estimated weight, and means responsive to and acting in accordance with said single indication of said weighing device for selecting and for delivering simultaneously said selected small increments with said weighed increment to provide a bundle of said strands of unit weight.

2. In a machine for apportioning and weighing quantities of macaroni and similar strand products to provide bundles of said strands of unit weight, the combination of a supply means for said product, a transfer element constructed and arranged to accept from said supply means volumetrically apportioned mounts of said product including a large increment receptacle proportioned to accept a volumetrically apportioned large increment having an estimated slightly less than unit weight, and, a plurality of small increment receptacles proportioned to receive volumetrically apportioned smaller increments each having an estimated weight, a weighing device to which said large increment of said produce is transferred and by which said large increment is weighed to provide a single indication of the amount by which the product weighs less than said unit weight, and means controlled by said single indication of said weighing device for selecting and for adding to said large increment simultaneously smaller increments selected from said plurality of volumetrically apportioned smaller increments to provide an additional amount of said product estimated to provide a bundle of said product of unit weight.

3. In a machine for apportioning and weighing quantities of macaroni and similar strand products to provide bundles of said strands of unit weight, the combination of a hopper constructed and arranged to support a supply of said strands in a substantially parallel alignment, a transfer element having receptacles adapted to receive from the hopper bundles of said strands, said receptacles being of graduated sizes to provide a large receptacle supported increment of said product having less than the unit weight, and a plurality of smaller receptacle supported increments of said product, each said smaller increment being of predetermined size and having an estimated weight, a weighing device, means for transferring from said transfer device to said weighing device said large increment of said product, said weighing device acting when rendered operative to provide an indication of the amount by which said large increment weighs less than said unit weight, and means controlled by said indication by said weighing device for adding from selected receptacles smaller increments of said strands to provide a bundle of unit weight.

4. In a machine for apportioning and weighing quantities of macaroni and similar strand products to provide bundles of said strands of unit weight, the combination of a supply source of said product, a weighing device, a transfer element constructed and arranged to transfer from said supply source volumetrically apportioned amounts of said product including a volumetrically apportioned large increment having an estimated weight of slightly less than the total unit weight, and a plurality of volumetrically apportioned small increments each having an estimated weight, means for transferring from said transfer device to said weighing device and for weighing said large increment of said product to provide an indication of the amount by which said large increment weighs less than said unit weight, means controlled by said weighing device for selecting from said small increments of said product a total estimated weight equal to the weight deficiency of said large increment as determined by said indication by said weighing device, and means for combining said selected small increments and said weighed increment to provide a bundle of said product of unit weight.

5. A machine for apportioning and weighing quantities of macaroni and similar products to provide bundles of said strands of unit weight according to claim 4 in which said small increments are apportioned to have estimated weights suitable for combination with a binary system of numbers, and in which the means controlled by said weighing device for selecting said small increments comprises electrically operated means for effecting delivery of selected small increments, means having a response proportioned to the weight deficiency registered by said weighing device, and an electrically operated converter actuated by the response of said last recited means and arranged to convert said response in accordance with a binary system of numbers to actuate said electrically operated means.

6. In a machine for apportioning and weighing quantities of macaroni and similar strand products to provide bundles of said strands of unit weight in accordance with claim 4 in which said small increments are volumetrically apportioned to have progressively larger estimated weights, and in which the means controlled by said weighing device for selecting from said small increments comprises electrically operated means for effecting delivery of each of said small increments, electrical connections between said weighing device and each of said delivery means, and means having a response proportioned to the weight deficiency registered by said weighing device and acting through said electrical connections for effecting delivery of small increments selected to overcome said weight deficiency as registered by said weighing device.

7. In a machine for apportioning and weighing quantities of macaroni and similar strand products to provide bundles of said strands of unit weight, the combination of a supply source of said product, a transfer device having recesses formed to receive from said supply volumetrically apportioned amounts of said product including a volumetrically apportioned large increment having an estimated weight of less than the total unit weight, and a plurality of volumetrically apportioned small increments selected to provide a plurality of small increments each of a selected estimated weight, means for removing from said recesses and for weighing said large increment, and thereby to provide an indication of the deficiency in weight of said large increment with respect to said unit weight, and means controlled by said weighing means in accordance with said indication for adding to said large increment a selected number of said small increments having a total estimated weight equal to the weight deficiency of said large increment as determined by said indication of the weighing means.

8. In a machine for apportioning and weighing quantities of macaroni and similar strand products to provide bundles of said strands of unit weight, the combination of a hopper having vanes disposed in unidirectional transverse plane for guiding the strands into a horizontally disposed parallel relation, means for vibrating said hopper and the strands contained in said hopper in said unidirectional transverse plane, a transfer element having receptacles adapted to receive from the hopper bundles of said strands including at least one large receptacle of predetermined size having less than the unit weight and a plurality of smaller incremental receptacles, each of a predetermined size, means for weighing said large bundle, and means controlled by said weighing means for adding selected incremental bundles of said strands to provide a bundle of unit weight.

9. In a machine for apportioning and weighing quantities of macaroni and similar strand products to provide bundles of said strands of unit weight, the combination of a transfer member which comprises a wheel arranged to turn on a horizontal axis having a cylindrically formed peripheral surface of a width substantially less than the average length of said strands, said peripheral surface having formed therein a series of laterally disposed slots sized to provide a repository for at least one large increment of said product of a size to have an estimated less-than-unit weight and a plurality of small receptacles of predetermined small sizes for a plurality of small increments each of an estimated weight, said small increments having an aggregate estimated weight sufficient with said large increment to provide a bundle of said strands of said unit weight, a loading station including means for filling said slots with strands located adjacent the periphery of said wheel at one side thereof, a discharge station having a different location adjacent the periphery of said wheel, a weighing device having means to provide an indication of the amount by which the product weighs less than the unit weight, means at the discharge station for delivering said large increment to the weighing device for weighing, and means responsive to said indication of said weighing device to make a selection of said small receptacles and to effect simultaneous delivery of the small increments so selected with said weighed large increment to provide a bundle of said strands of unit weight.

10. In a machine for apportioning and weighing quantities of macaroni and similar strand products to provide bundles of said strands of unit weight, the combination of a wheel arranged to turn on a horizontal axis having a cylindrically formed peripheral surface of a width substantially less than the average length of said strands and having formed in the periphery thereof a plurality of laterally disposed large increment slots providing a repository for said large increment of said product of a size to have an indicated less-than-unit weight, and a plurality of small increment slots providing receptacles to receive small increments of predetermined small sizes having an aggregate estimated weight sufficient with said large increment to provide a bundle of said strands of said unit weight, a hopper having vanes disposed in unidirectional planes laterally of said wheel for guiding the strands into a horizontally disposed parallel relation to one another and laterally of said wheel, means for vibrating said hopper and the strands contained in said hopper in said lateral direction to assist in guiding said strands into said parallel relation and in loading said strands into the receptacles of said wheel, a weighing device having means to indicate the amount by which the product weighs less than said unit weight, means for delivering said large increment to the weighing device for weighing, and means responsive to an indication of said weighing device to effect delivery of selected small increments from selected small slots with said weighed large increment to provide said bundle of unit weight.

11. In a machine for apportioning and weighing quantities of macaroni and similar strand products to provide bundles of said strands of unit weight, the combination of a wheel arranged to turn on a horizontal axis having a cylindrically formed peripheral surface of a width substantially less than the average length of said strands and having the periphery thereof slotted transversely to provide a repository for a large increment of said product, said large increment being of a size to have an estimated less-than-unit weight, and to provide receptacles to receive small increments of predetermined small sizes having an aggregate estimated weight sufficient with said large increment to provide a bundle of said strands of said unit weight, means for rotating the wheel, a strand storage hopper disposed adjacent an upwardly-moving portion of the wheel and having an aperture for loading said strands into the slots of said wheel, a discharge station disposed adjacent a downwardly moving portion of said wheel including a weighing device having means to provide an indication of the amount by which the product weighs less than said unit weight, and means for delivering said large increment of said strands to the weighing device for weighing and to discharge the weighed large increment, and means responsive to said indication of said weighing device to make a selection of strands from said small slots having a total estimated weight equal to said deficiency, and thereafter to deliver additional strands from said selected small slots with said discharged large increment to provide said bundle of unit weight.

12. A machine for apportioning and weighing quantities of macaroni and similar strand products to provide bundles of said strands of unit weight according to claim 11 which comprises a weighing device having a scale and a pan to receive said large increment of said strands, and means actuated by the scale to provide a single indication accurate within a permissible margin of error of the total amount by which the product weighs less than said unit weight.

13. A machine for apportioning and weighing quantities of macaroni and similar strand products to provide bundles of said strands of unit weight according to claim 11 which comprises a weighing device having a scale and a pan to receive said large increment of strands; means for delivering said large increment of said strands to the weighing device for weighing and to discharge the weighed large increment which comprises a sweep movable with relation to said wheel and said weighing device to receive from the wheel and to deposit in the pan said large increment and simultaneously to discharge from the pan the previously weighed large increment of said strands.

14. A machine for apportioning and weighing quantities of macaroni and similar strand products to provide bundles of said strands of unit weight according to claim 11 which comprises a weighing device having a scale and a pan to receive said large increment of strands; means for delivering said large increment of said strands to the weighing device for weighing and to discharge the weighed large increment, which comprises a paddle rotatable to receive from the rotating wheel each successively discharge large increment of said strands, a sweep rotatable to receive from said paddle and to deposit in the pan each said large increment and simultaneously to discharge from the pan the previously weighed large increment of said strands, and means for rotating said wheel and said paddle and sweep in timed relation.

15. A machine for apportioning and weighing quantities of macaroni and similar strand products to provide bundles of said strand of unit weight according to claim 11 in which a slot size adjusting member is provided shiftable to partially obstruct a large increment slot to be loaded and thereby to adjust the capacity of said large increment slot in accordance with the bulk of the product being bundled.

16. A machine for apportioning and weighing quantities of macaroni and similar strand products to provide bundles of said strands of unit weight according to claim 11 in which there is provided a stationary support, a cam adjustably mounted on the support and positioned with relation to said wheel and said hopper to adjustably determine the depth of each said large increment slot during the loading of said slot.

17. A machine for apportioning and weighing quantities of macaroni and similar strand products to provide bundles of said strands of unit weight according to claim 11 in which there is provided a travelling guard adapted to close the slots of the wheel moving from the hopper to said discharge station, separate slot closing devices for closing each individual small increment slot, means adjacent said hopper for closing the filled small increment slots, and means controlled by said indication of said weighing device for actuating selected slot closing devices to open said selected small increment slots.

18. In a machine for apportioning and weighing quantities of macaroni and similar strand products to provide bundles of said strands of unit weight, the combination of a wheel arranged to turn on a horizontal axis having a cylindrically formed peripheral surface of a width substantially less than the average length of said strands and having the periphery thereof slotted transversely to provide a plurality of repositories for a plurality of large increments of said product each large increment being of a size to have an indicated less-than-unit weight, and a plurality of small increment receptacles associated with each large increment repository for small increments of predetermined small sizes having an aggregate estimated weight sufficient with said associated large increment to provide a bundle of said strands of said unit weight, means for continuously rotating said wheel, a strand storage hopper disposed adjacent an upwardly moving portion of the wheel and having an aperture for loading said strands into the receptacles of said wheel, a weighing device having means to provide a single indication of the amount by which the product weighs less than said unit weight, means for delivering successively each said large increment of said strands to the weighing device for weighing and to discharge the weighed large increment, and means responsive to each successive single indication of said weighing device to deliver additional strand increments simultaneously from selected small increment slots associated with said large increment slot which together with said discharged large increment provide successive bundles of strands of unit weight.

19. In a machine for apportioning and weighing quantities of macaroni and similar strand products to provide bundles of said strands of unit weight, the combination of a transfer member which comprises a wheel arranged to turn on a horizontal axis having a cylindrically formed peripheral surface of a width substantially less than the average length of said strands, said peripheral surface having formed therein a series of laterally disposed slots sized to provide repositories for increments of said product, means for rotating the wheel, a hopper located at one side of said wheel for loading strands from the hopper into said slots during upward movement of the wheel past the hopper, a pair of side flanges secured to the hopper and arranged to overlie the ends of strands fed into said slots, means for imparting a vibratory movement to the hopper and said side flanges secured thereto transversely of the peripheral surface of said wheel, and means including a weighing device located adjacent a downwardly moving portion of said wheel for delivering from said slots, for weighing, and for combining increments of said strands from said slots to provide bundles of said strands of unit weight.

20. The method of apportioning and weighing quantities of macaroni and similar strand products to provide bundles of said strands of unit weight, which comprises the steps of separating from supply volumetrically determined increments of said strands including a large increment having an estimated less-than-unit weight and a plurality of small increments, each having an estimated weight, the total estimated weight of said small increments being at least equal to the deficiency of the estimated less-than-unit weight of the large increment, weighing said large increment to provide a single indication accurate within a permissible margin of error of the amount by which said large increment weighs less than the unit weight, and adding to said large increment in a single operation selected small increments having a sum of estimated weights equal to said deficiency within said permissible margin of error to provide a bundle of said strands of unit weight.

21. A method of apportioning and weighing quantities of macaroni and similar strand products to provide bundles of said strands of unit weight, which comprises the steps of separating from supply a volumetrically determined increment of said strands including a large increment having an estimated less-than-unit weight, and a plurality of small increments having individually volumetrically determined estimated weights in a ratio of one to another of 1:2:4 etc. in geometrical progression and having a total estimated weight equal to the deficiency of the estimated weight of said large increment, weighing said large increment to provide an indication of the amount by which said large increment weighs less than the unit weight making a selection of said small increments having a total estimated weight equal to said indicated weight deficiency, and adding to the weighed large increment said selected small increments having a total estimated weight equal to the weight deficiency determined by said weighing operation, to provide a bundle of said strands of unit weight.

22. In a machine for apportioning quantities of macaroni and similar strand products, the combination of a wheel arranged to turn on a horizontal axis having a cylindrically formed peripheral surface of a width substantially less than the average length of said strands and having formed in the periphery thereof at least one laterally disposed strand product receiving slot, means for rotating said wheel in a direction to carry said slot upwardly past a loading station at one side of said wheel and past a discharge station located adajcent another side of said wheel, a strand product supply hopper located at said loading station having a strand transfer aperture overlying the periphery of said wheel, and means for vibrating said hopper laterally of the periphery of said wheel in a direction substantially parallel to said slot to orient said strands in said lateral direction and to assist in the transfer of said strands from the hopper into said slot.

23. In a machine for apportioning and weighing quantities of macaroni and similar strand products, the combination of a wheel arranged to turn on a horizontal axis having a cylindrically formed peripheral surface of a width substantially less than the average length of said strands and having formed in the periphery thereof laterally disposed strand receiving slots, means for rotating said wheel in a direction to carry said slots upwardly past a loading station at one side of said wheel and past a discharge station located at another side of said wheel, a strand product supply hopper located at said loading station having a strand transfer aperture overlying the periphery of said wheel, means for vibrating said hopper laterally of the periphery of said wheel in a direction substantially parallel to said slot to orient said strands in said lateral direction and to assist in the transfer of said strands from the hopper into said slots, and a weighing device at said discharge station for weighing the strands discharged from said slots.

References Cited in the file of this patent

UNITED STATES PATENTS

| 1,019,555 | Taylor | Mar. 5, 1912 |
| 1,259,836 | Close | Mar. 19, 1918 |
| 1,439,843 | Schick | Dec. 26, 1922 |
| 2,198,788 | Popov | Apr. 30, 1940 |
| 2,324,667 | Baker et al. | July 20, 1943 |
| 2,659,562 | Cloud et al. | Nov. 17, 1953 |
| 2,802,658 | Hensgen et al. | Aug. 13, 1957 |

FOREIGN PATENTS

| 528,405 | Germany | June 29, 1931 |
| 492,634 | Great Britain | Sept. 23, 1938 |